US007513390B2

(12) United States Patent
Artsiely

(10) Patent No.: US 7,513,390 B2
(45) Date of Patent: Apr. 7, 2009

(54) VENDING MACHINE WITH ONE-WAY MECHANISM FIELD OF THE INVENTION

(75) Inventor: Eyal Artsiely, Bikat Yericho (IL)

(73) Assignee: Hotel Outsource Management International, Inc., New York, NY (US)

( * ) Notice: Subject to any disclaimer, the term of this patent is extended or adjusted under 35 U.S.C. 154(b) by 137 days.

(21) Appl. No.: 11/447,003

(22) Filed: Jun. 6, 2006

(65) Prior Publication Data

US 2007/0289990 A1 Dec. 20, 2007

(51) Int. Cl.
*B65G 59/00* (2006.01)

(52) U.S. Cl. ....................... 221/152; 221/151; 221/193; 221/289; 221/295; 221/263

(58) Field of Classification Search ................. 221/152, 221/151, 193, 251, 289, 295, 263
See application file for complete search history.

(56) References Cited

U.S. PATENT DOCUMENTS

| | | | | | |
|---|---|---|---|---|---|
| 495,351 | A * | 4/1893 | Luster | ........................ | 221/131 |
| 2,711,241 | A * | 6/1955 | Abrahamsen | ............... | 221/256 |
| 3,743,137 | A * | 7/1973 | Bennett | ....................... | 221/289 |
| 5,247,798 | A * | 9/1993 | Collard, Jr. | ................. | 221/266 |
| 5,377,866 | A * | 1/1995 | Watters, II | .................. | 221/194 |
| 6,206,237 | B1 * | 3/2001 | Dillon et al. | ................ | 221/289 |
| 6,234,345 | B1 * | 5/2001 | Minh et al. | ................. | 221/124 |

FOREIGN PATENT DOCUMENTS

| | | | |
|---|---|---|---|
| EP | 0292448 | A | 11/1988 |
| GB | 1536532 | A | 12/1978 |
| GB | 2135292 | A | 8/1984 |
| GB | 2161630 | A | 1/1986 |

* cited by examiner

*Primary Examiner*—Gene Crawford
*Assistant Examiner*—Timothy R Waggoner
(74) *Attorney, Agent, or Firm*—Dekel Patent Ltd.; David Klein

(57) ABSTRACT

A vending machine including a dispensing door openable to permit removal of merchandise from the vending machine, and a one-way stopper positioned relative to the dispensing door, such that upon removal of merchandise from the vending machine, the one-way stopper is deployed to a position that prevents placing the merchandise back in the vending machine.

8 Claims, 17 Drawing Sheets

VENDING MACHINE WITH ONE-WAY MECHANISM FIELD OF THE INVENTION

FIELD OF THE INVENTION

The present invention relates generally to vending machines, and particularly to a vending machine with a one-way mechanism, which prevents a person who has purchased an item, such as a beverage can, from placing the item back in the vending machine.

BACKGROUND OF THE INVENTION

Vending machines for vending beverage cans and the like are generally designed such that upon payment of money the machine releases a beverage can and the like, which is conveyed to an opening so that the customer can take the can and the like from the machine.

It is clear that the vendor wants the customer to take the article for which payment was made and to prevent unscrupulous users from stealing merchandise from the machine. The vendor would also like to prevent a user from selecting and paying for the wrong merchandise.

Many vending machine mechanisms have been proposed to accomplish these goals. For example, U.S. Patent Application US2005077311 to Chang describes a coin-operated vending machine includes a one-way indexing mechanism that prevents unscrupulous users from taking out more merchandise than payment was made for. Japanese Patent Documents 2004234489 and JP2004295343 describe vending machines that only can move the vended items in one direction. A user is prevented from selecting the wrong merchandise with a one-way clutch. U.S. Pat. No. 5,531,355 describes a machine for vending stacked articles, such as newspapers, one at a time. The machine includes a mechanism that allows the vended article to issue outward, but prevents a dishonest customer from reaching through the slot to take additional papers.

However, the prior art has neglected another problem, which is in a way the opposite of the abovementioned problems, the problem being trying to prevent a person who has purchased an item from placing the item back in the vending machine. Such a problem may occur in a hotel and the like where a vending machine is in a guest room and guests can take out beverage cans and get billed at checkout time. If the possibility exists that a person can place the item back in the vending machine, a dishonest person can take out the item and yet falsely claim later that he put back the item and refuse to pay for it, so as to get around paying for the beverage can and the like at checkout.

SUMMARY OF THE INVENTION

The present invention seeks to provide a novel vending machine, as described more in detail hereinbelow. The vending machine has a one-way mechanism, which prevents a person who has purchased an item, such as a beverage can, from placing the item back in the vending machine. Since it is impossible to place the item back in the vending machine, a dishonest person cannot take out the item and claim later that he put back the item. The invention thus ensures hotels and the like of collecting money for the purchased merchandise. The one-way stopper mechanism may also prevent introduction of foreign objects into the vending machine. The one-way stopper mechanism may also prevent opening the dispensing door without taking out merchandise, thereby eliminating false charges for merchandise that was never taken.

There is thus provided in accordance with an embodiment of the invention apparatus including a vending machine including a dispensing door openable to permit removal of merchandise from the vending machine, and a one-way stopper positioned relative to the dispensing door, such that upon removal of merchandise from the vending machine, the one-way stopper is deployed to a position that prevents placing the merchandise back in the vending machine. When the one-way stopper is deployed to the position that prevents placing the merchandise back in the vending machine, the one-way stopper blocks the dispensing door from moving therepast.

The vending machine may include a tray loadable with the merchandise for dispensing thereof, the dispensing door being openable to permit removal of merchandise from the tray.

The dispensing door may be biasedly pivoted about a pivot axle by means of a biasing device. The dispensing door may be formed with a window in which is disposed the one-way stopper. The one-way stopper may be biasedly pivoted about a pivot axle by means of a biasing device, the biasing device being adapted to urge the one-way stopper to the position that prevents placing the merchandise back in the vending machine. The one-way stopper may include a pair of lugs that jut sideways from lateral sides thereof.

The one-way stopper may be positioned such that a portion of the dispensing door abuts against a portion of the one-way stopper (e.g., the lugs) so as to arrest movement of the dispensing door.

BRIEF DESCRIPTION OF THE DRAWINGS

The present invention will be understood and appreciated more fully from the following detailed description, taken in conjunction with the drawings in which.

DETAILED DESCRIPTION OF EMBODIMENTS

Figure 1:
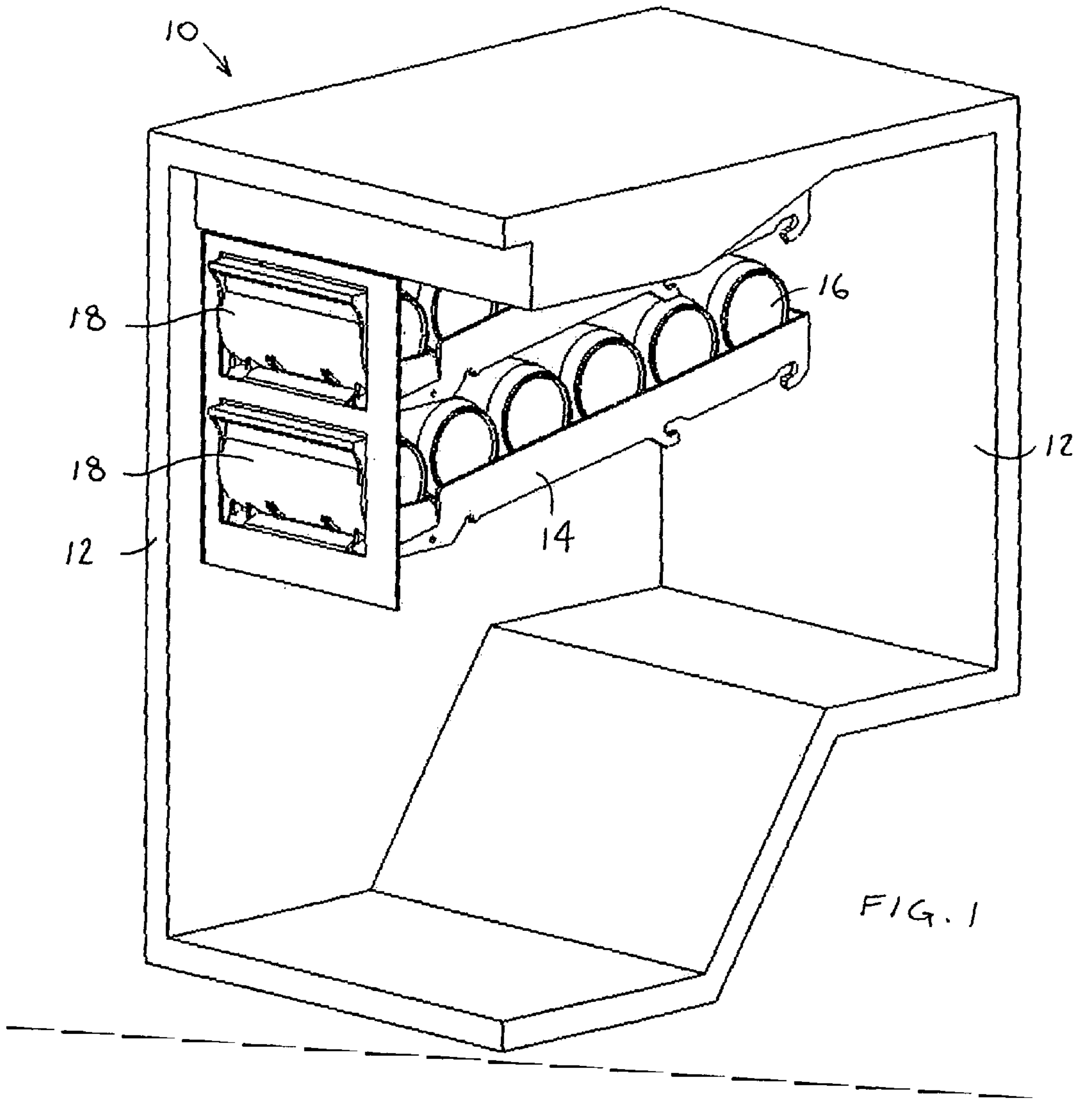
FIGS. 1 and 2 are simplified pictorial illustrations of a vending machine, constructed and operative in accordance with an embodiment of the present invention, with a dispensing door closed.

Reference is now made to FIGS. 1-4, which illustrate a vending machine, constructed and operative in accordance with an embodiment of the present invention.

Vending machine 10 may include a housing 12 that houses therein one or more trays 14 loaded with merchandise 16 (e.g., beverage cans) for dispensing thereof. Vending machine 10 may further include standard components of vending machines, such as but not limited to, a coin slot, a coin-operated mechanism, a lockable service door (which may be opened only by authorized personnel for replenishing the merchandise 16 in the trays 14) and refrigeration apparatus, if needed (all not shown), which are well known to those skilled in the art and require no description for the skilled artisan. The coin-operated mechanism is in operative communication with a dispensing door 18 of the tray 14, as is known in the art. As is known, the trays 14 are preferably slanted so the merchandise 16 is urged against the dispensing door 18 by gravity and the weight of the merchandise 16. One or more sensors 15 (shown in phantom lines in FIG. 2), such as but not limited to, photoelectric cells, load cells, capacitance sensors and the like, may be mounted on or in the vicinity of tray 14 to sense the presence of merchandise 16, such as to count the amount of merchandise 16 that has been purchased by an individual or to count the amount of merchandise 16 left on the tray 14.

Figure 2:
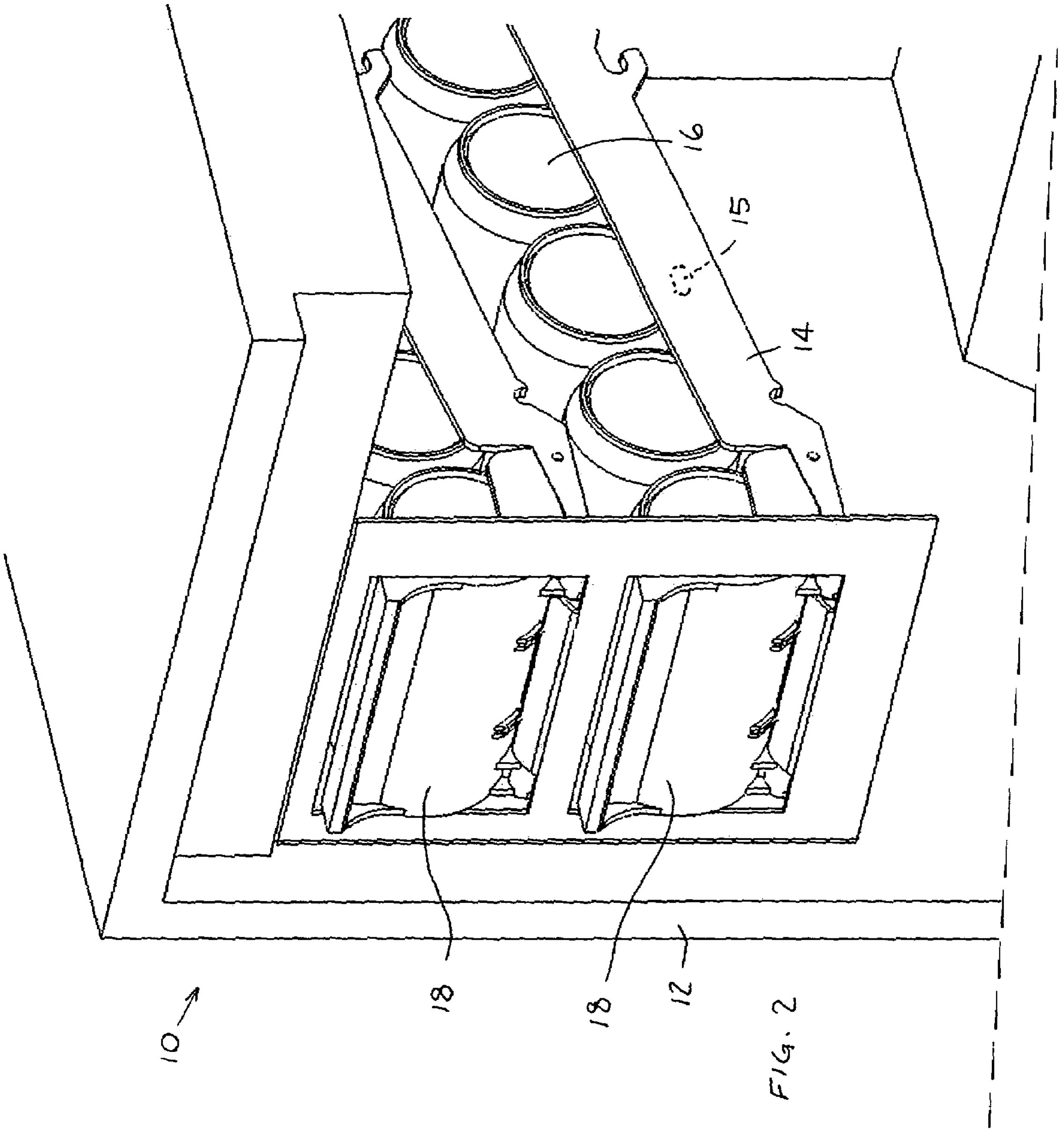
Figure 3:
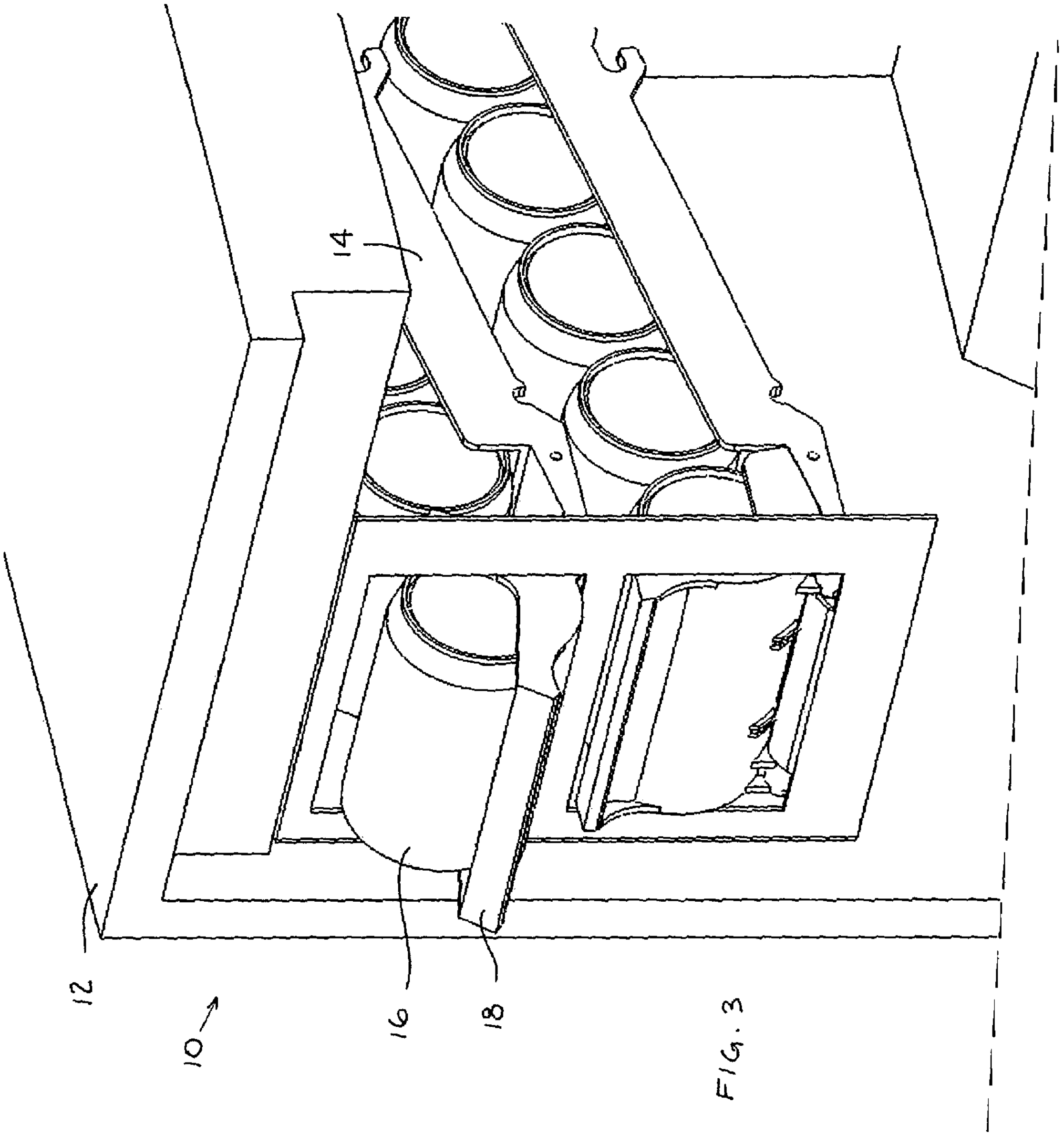
FIGS. 3 and 4 are simplified pictorial illustrations of the vending machine with the dispensing door open.
Figure 4:
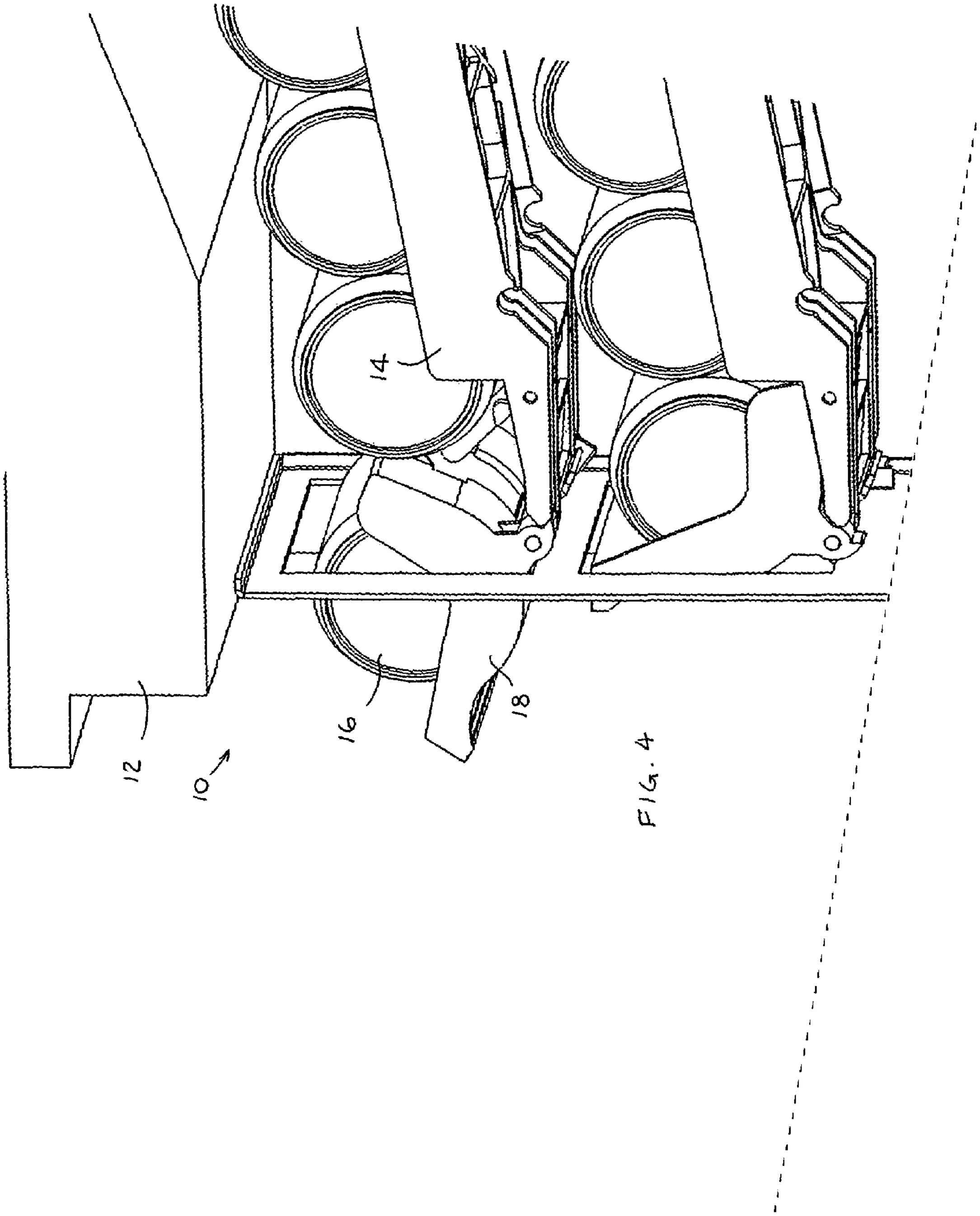

FIGS. 1 and 2 illustrate the vending machine 10 with the dispensing door 18 closed, whereas FIGS. 3 and 4 illustrate the vending machine 10 with the dispensing door 18 open.

Figure 5:
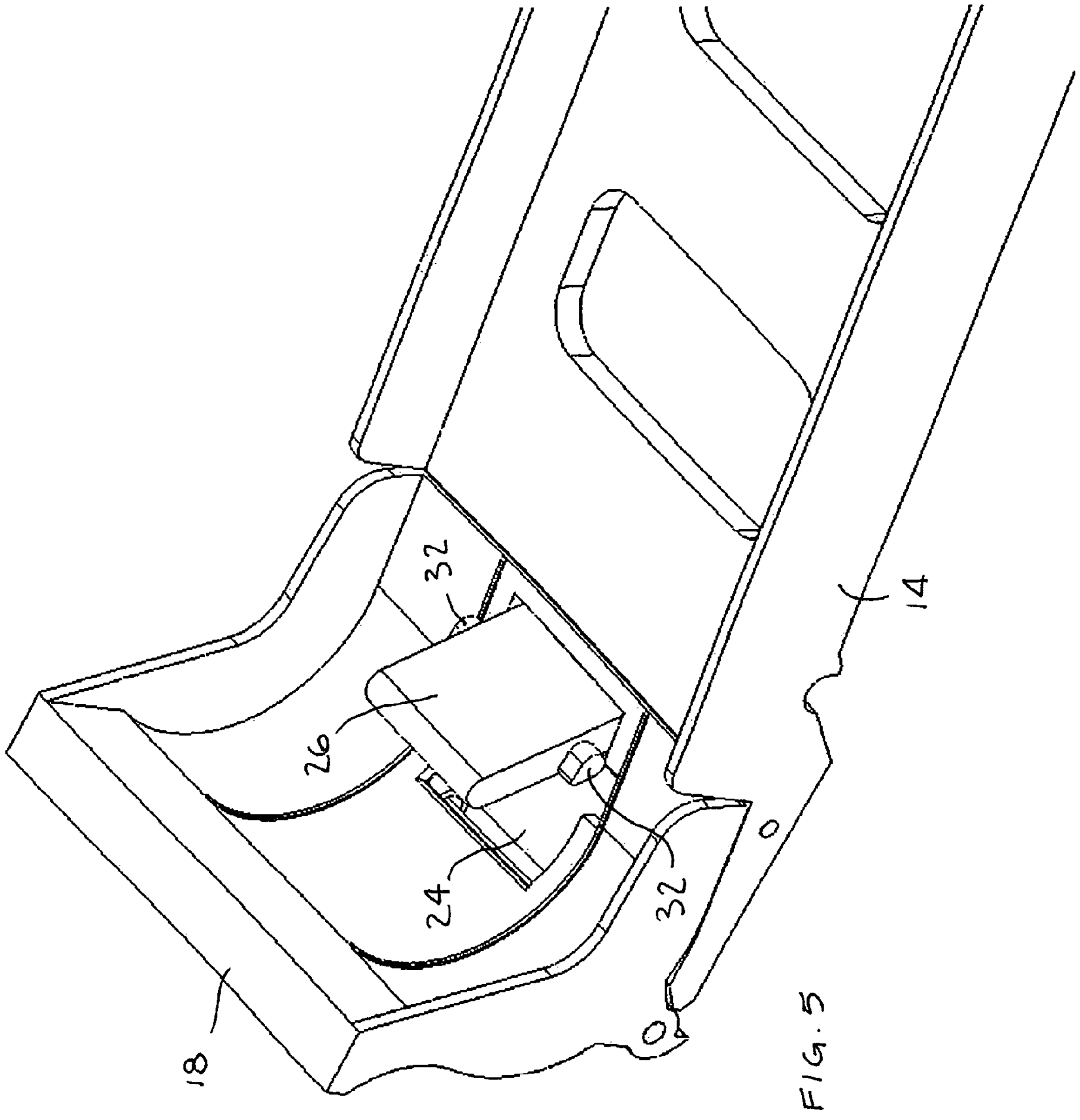
FIG. 5 is a simplified pictorial illustration of a tray with a one-way stopper used in the vending machine, constructed and operative in accordance with an embodiment of the present invention.
Figure 6:
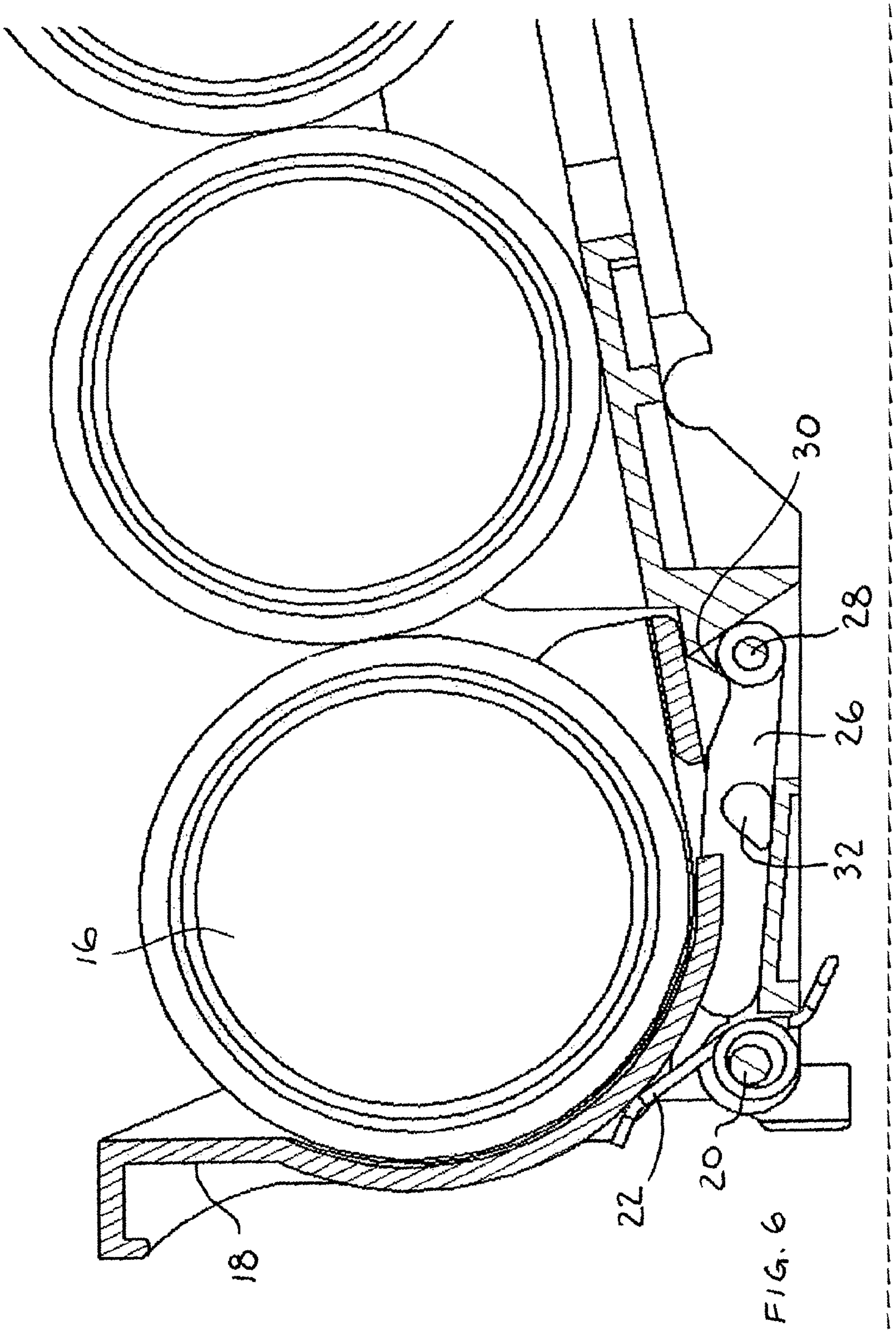
FIGS. 6 and 6A are simplified partially sectional and pictorial illustrations, respectively, of the vending machine, showing the dispensing door closed and the one-way stopper prior to being deployed.
Figure 6A:
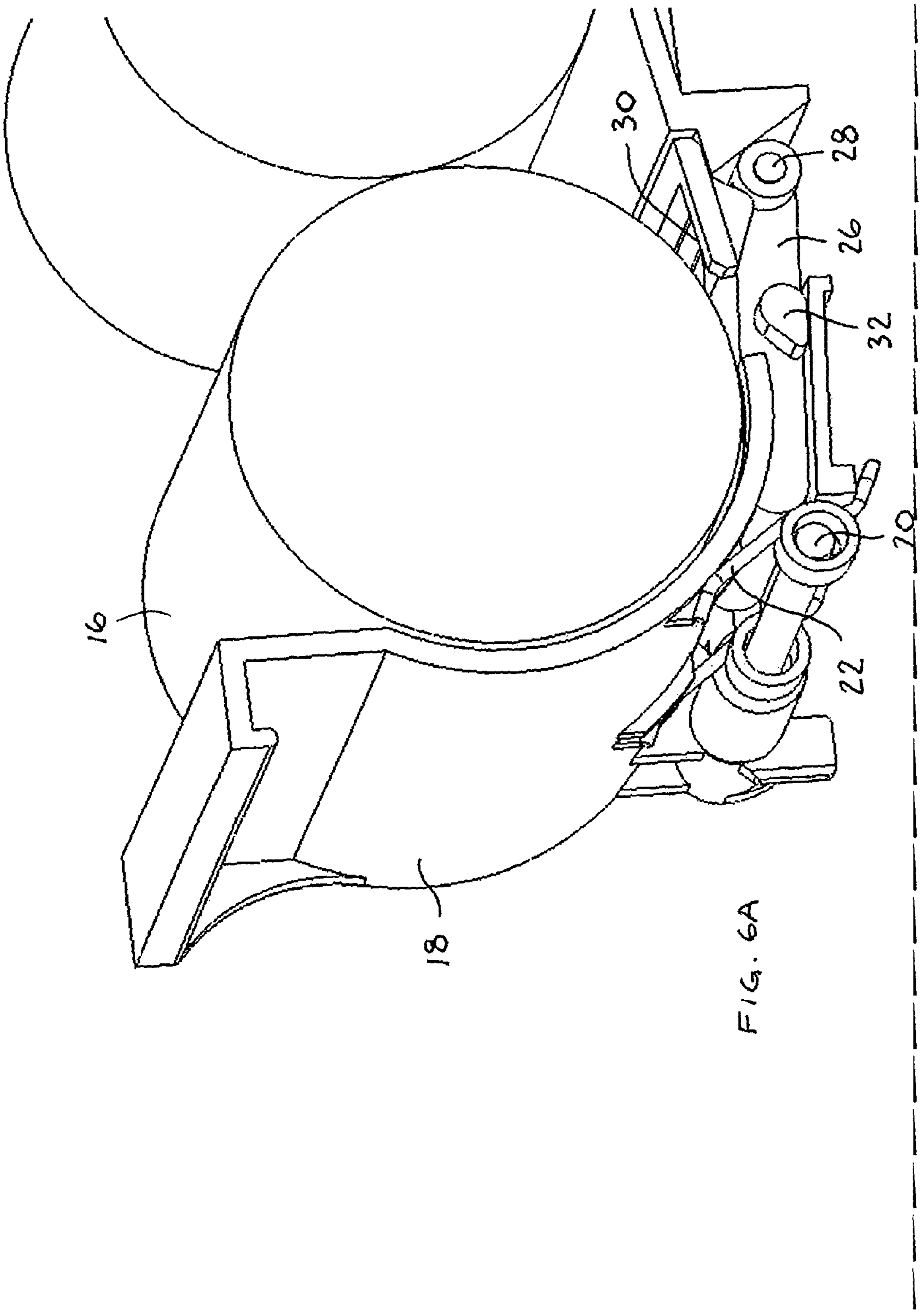

Reference is now made to FIGS. 5, 6 and 6A, which illustrate tray 14 more in detail. Dispensing door 18 may be shaped in accordance with the merchandise 16, such as in the case of beverage cans, being arcuately shaped. Door 18 may be biasedly pivoted about a pivot axle 20 by means of a biasing device 22, such as a spring (FIGS. 6 and 6A). (Alternatively, door 18 may be a sliding door.) Door 18 may be formed with a window 24 (FIG. 5) in which is disposed a one-way stopper 26. One-way stopper 26 may be biasedly pivoted about a pivot axle 28 by means of a biasing device 30, such as a spring (FIGS. 6 and 6A). Biasing device 22 urges dispensing door 18 to rotate clockwise (in the sense of the drawing figures) about pivot axle 20, and biasing device 30 urges one-way stopper 26 to rotate clockwise about pivot axle 28. One-way stopper 26 may include a pair of lugs 32 that jut sideways from the lateral sides of stopper 26.

FIGS. 6 and 6A illustrate the dispensing door 18 closed and the one-way stopper 26 prior to being deployed. One-way stopper 26 lies flat due to the weight of merchandise 16 lying thereupon.

Figure 7:
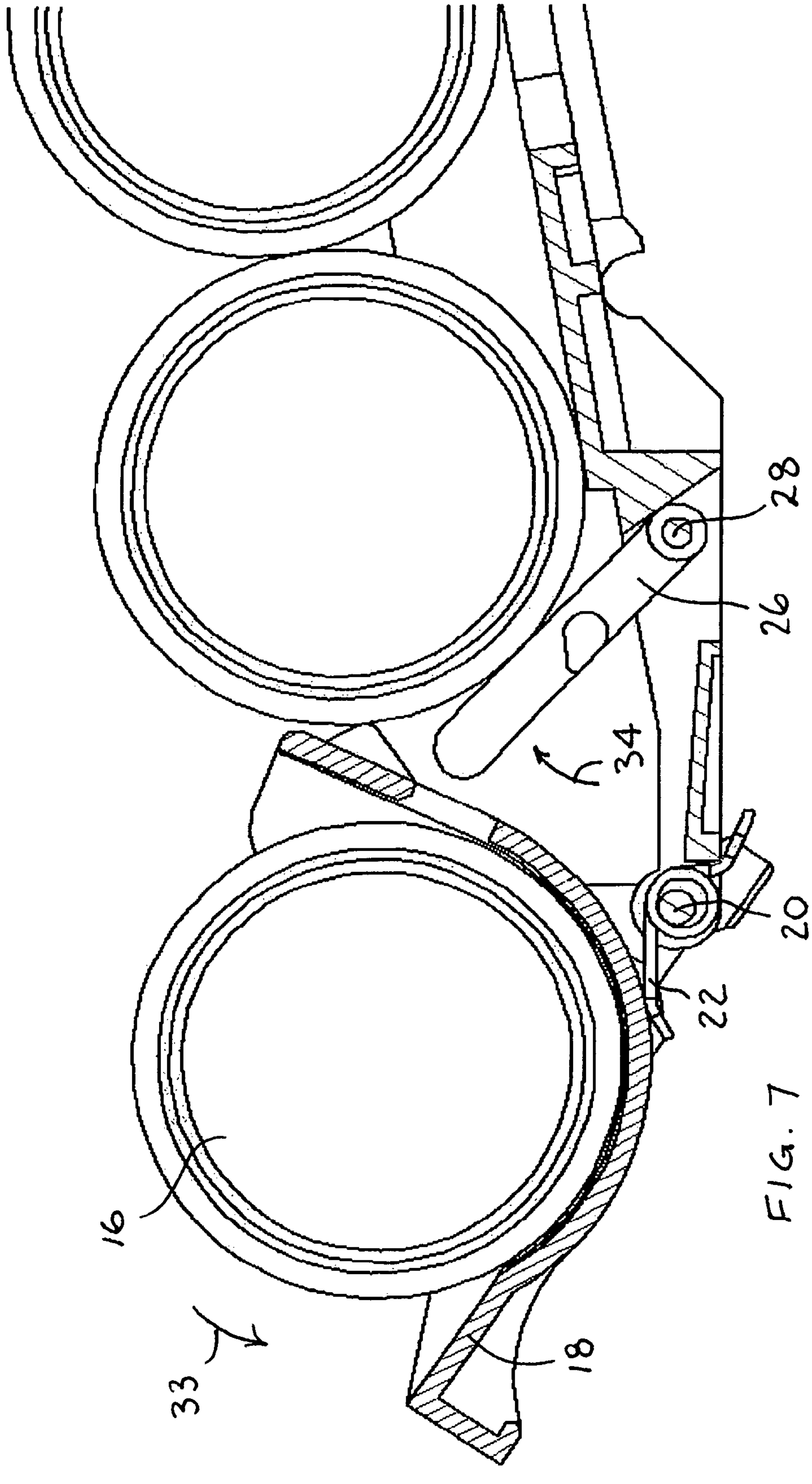
FIGS. 7 and 7A are simplified partially sectional and pictorial illustrations, respectively, of extracting merchandise from the vending machine.
Figure 7A:
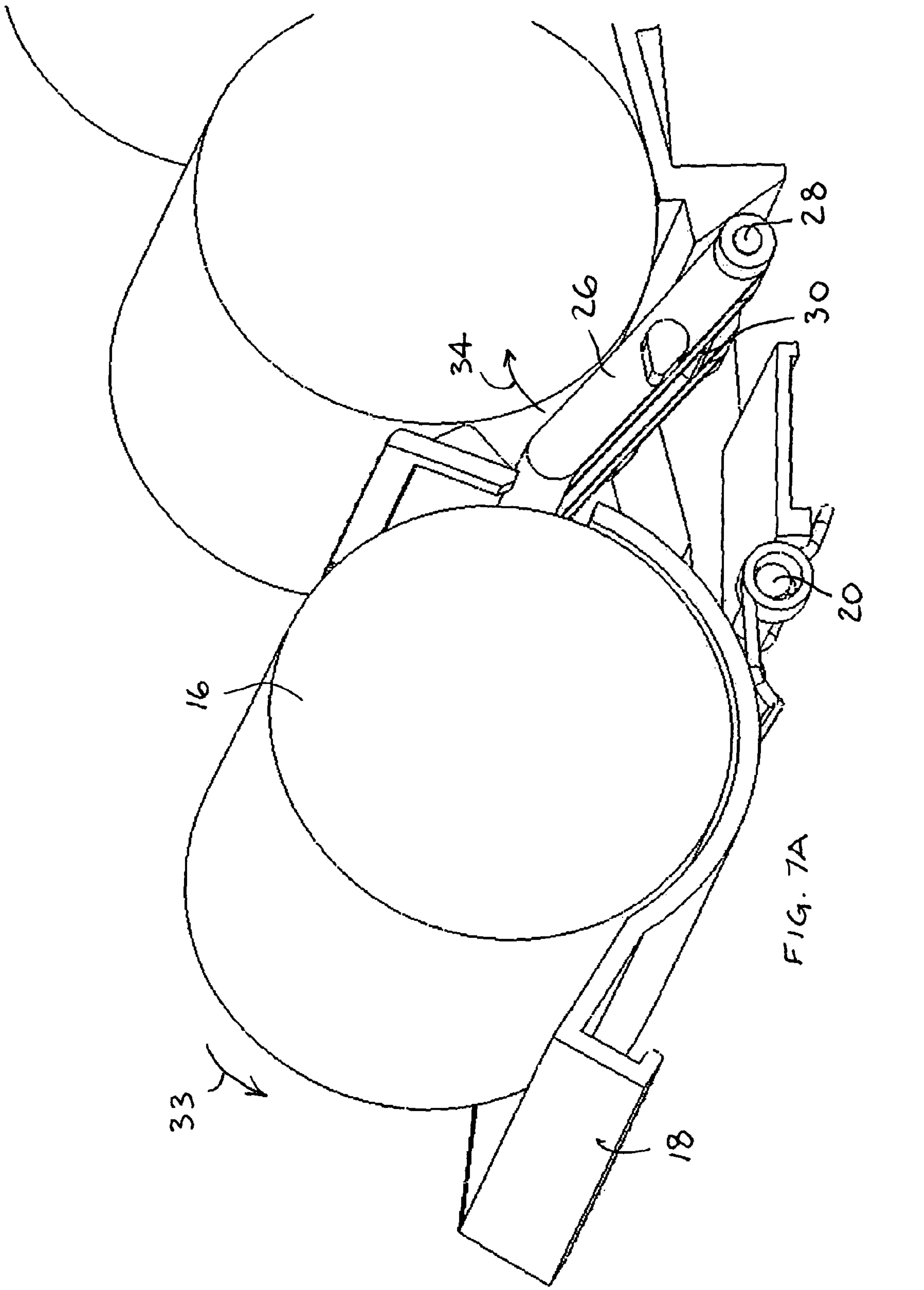

Reference is now made to FIGS. 7 and 7A, which illustrate extracting merchandise 16 from the vending machine 10. The merchandise 16 may be extracted by pulling the merchandise 16 from the tray 14. This action overcomes the countering force of biasing device 22 and rotates the door 18 counterclockwise (in the sense of the drawing figures) about pivot axle 20, as indicated by arrow 33. One-way stopper 26 is now free from the weight bearing upon it and biasing device 30 urges one-way stopper 26 to swing clockwise about pivot axle 28 and upwards, as indicated by arrow 34.

Figure 8:
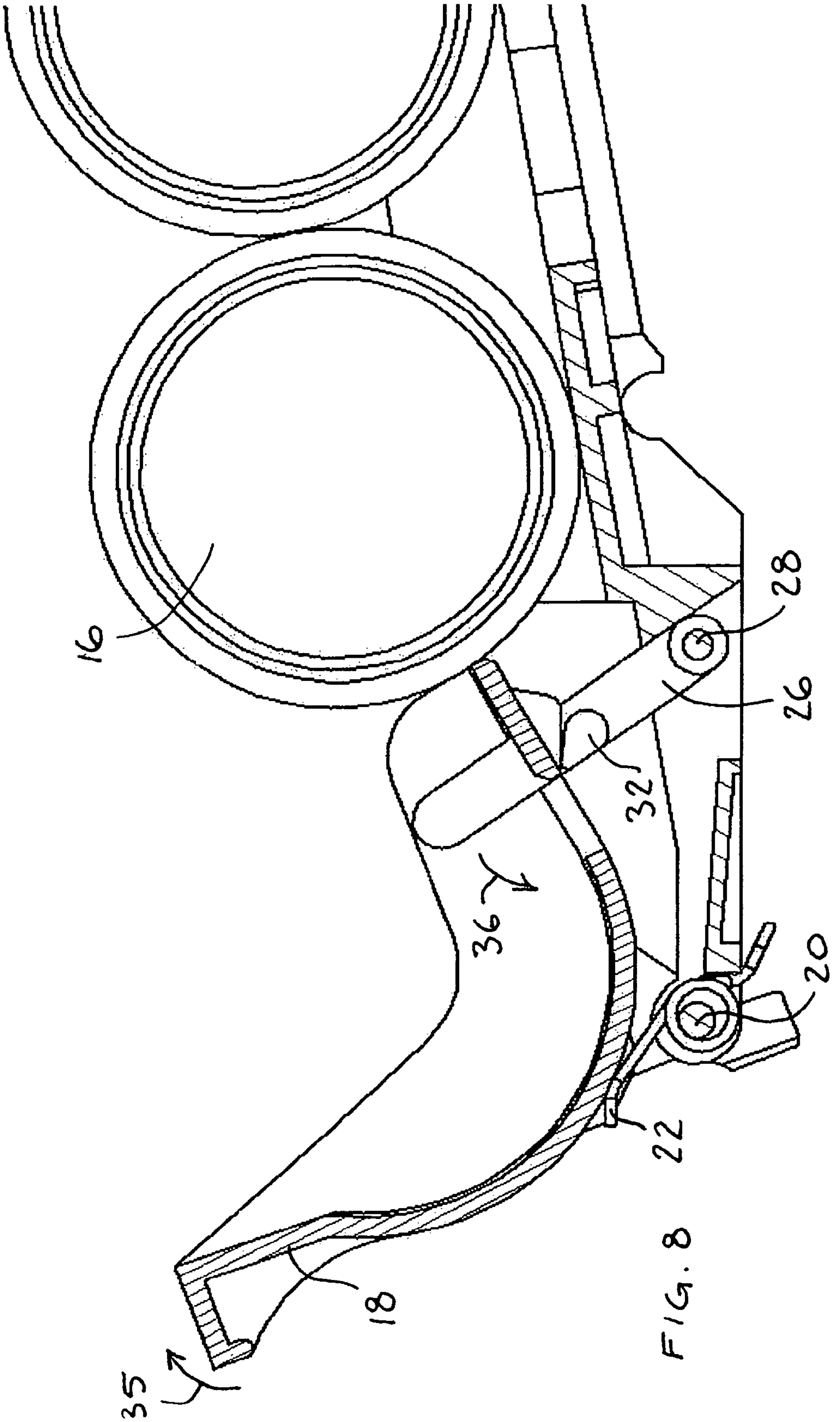
FIGS. 8 and 8A are simplified partially sectional and pictorial illustrations, respectively, of closing the dispensing door after extracting merchandise from the vending machine.
Figure 8A:
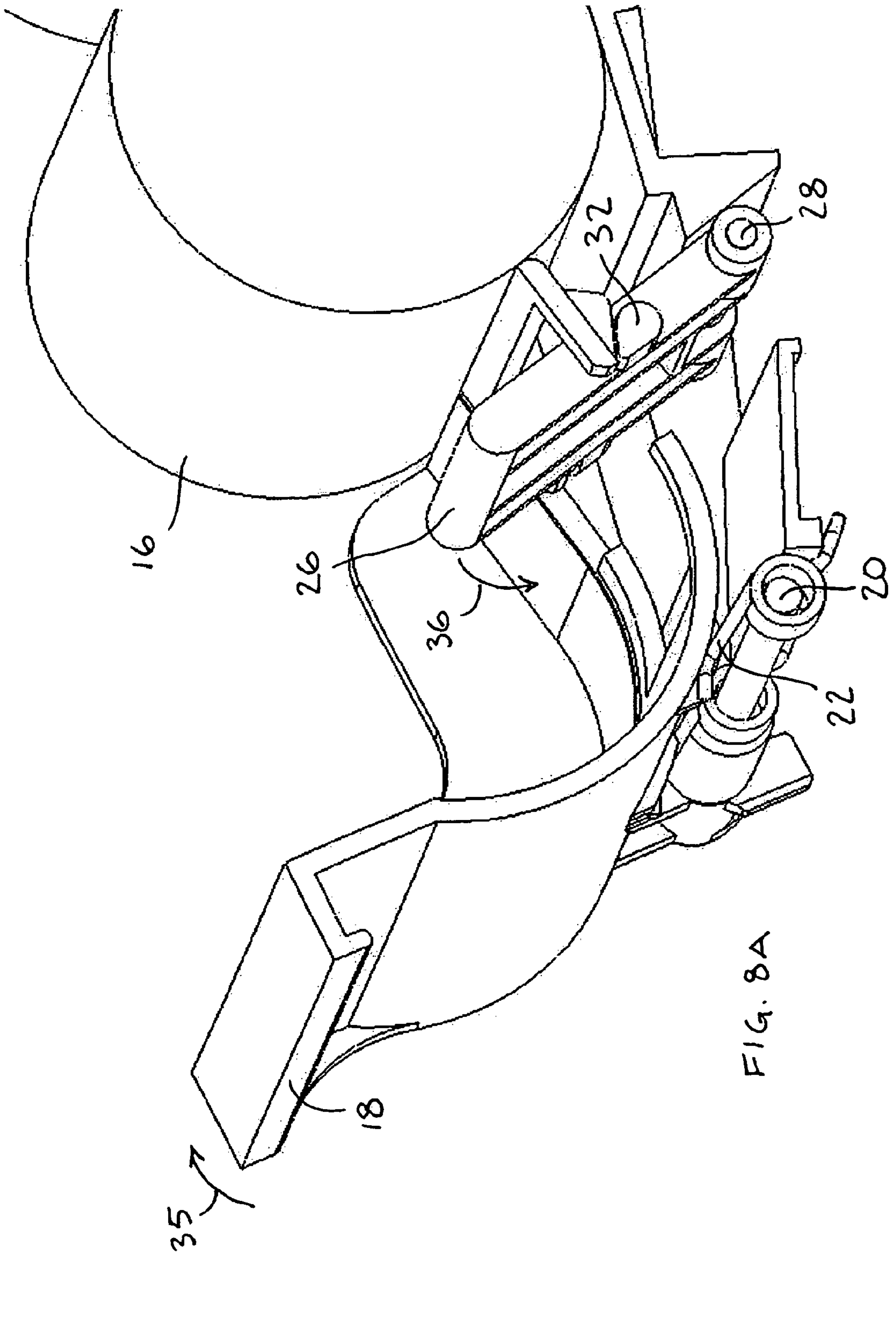

Reference is now made to FIGS. 8 and 8A, which illustrate closing the dispensing door 18 after extracting merchandise 16 from the vending machine 10. Biasing device 22 urges door 18 to rotate clockwise (in the sense of the drawing figures) about pivot axle 20, as indicated by arrow 35. The bottom of door 18 contacts and pushes down against lugs 32 of one-way stopper 26, overcoming the countering force of biasing device 30 and thereby causing one-way stopper 26 to swing counterclockwise (in the sense of the drawing figures) about pivot axle 28, as indicated by arrow 36. Any remaining merchandise 16 on the tray 14 moves or rolls to lie over one-way stopper 26. The weight of the merchandise 16 overcomes the countering force of biasing device 30 and keeps the one-way stopper 26 lying down.

Figure 9:
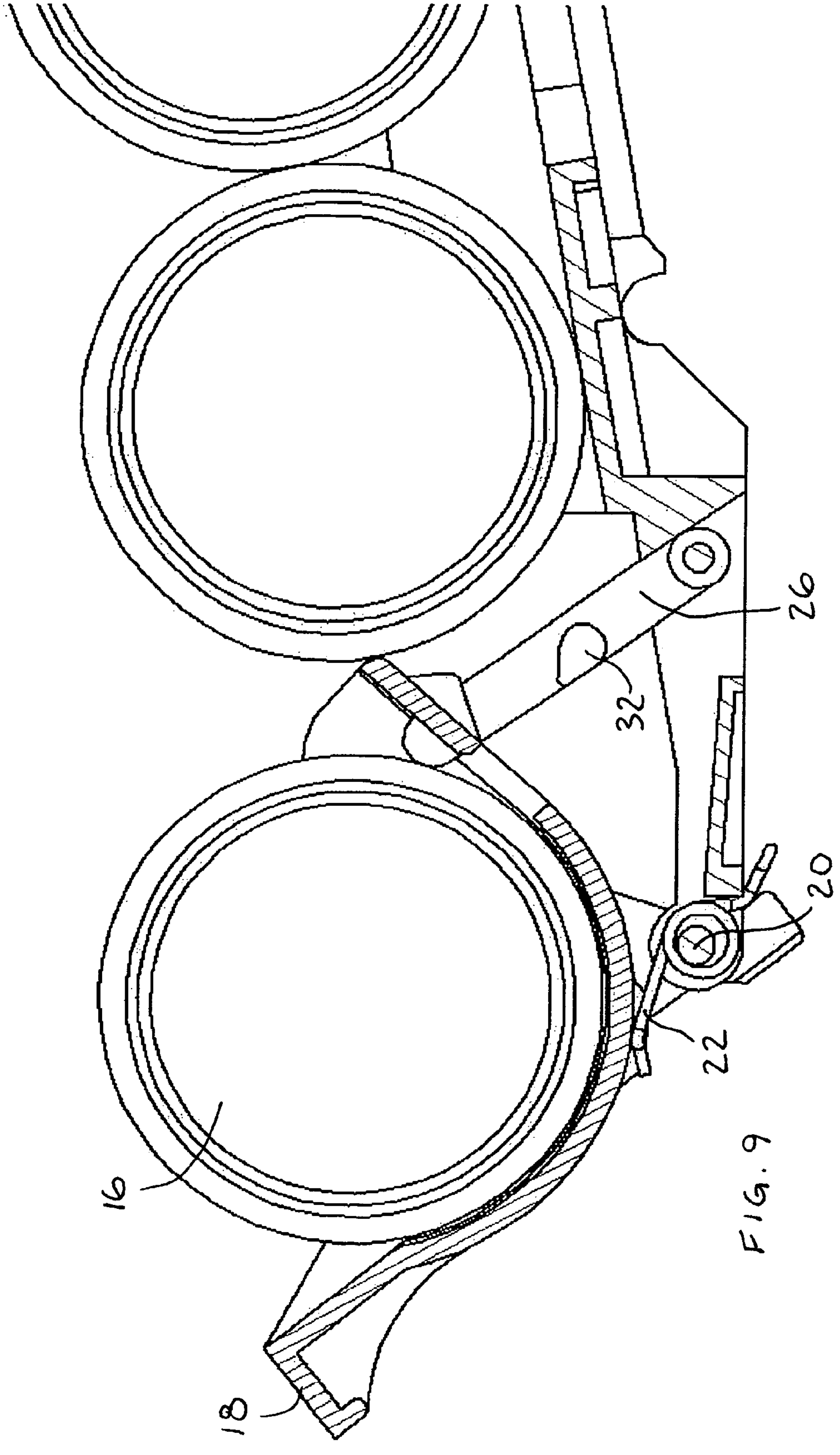
FIGS. 9 and 9A are simplified partially sectional and pictorial illustrations, respectively, of the one-way stopper preventing returning the merchandise back into the vending machine.
Figure 9A:
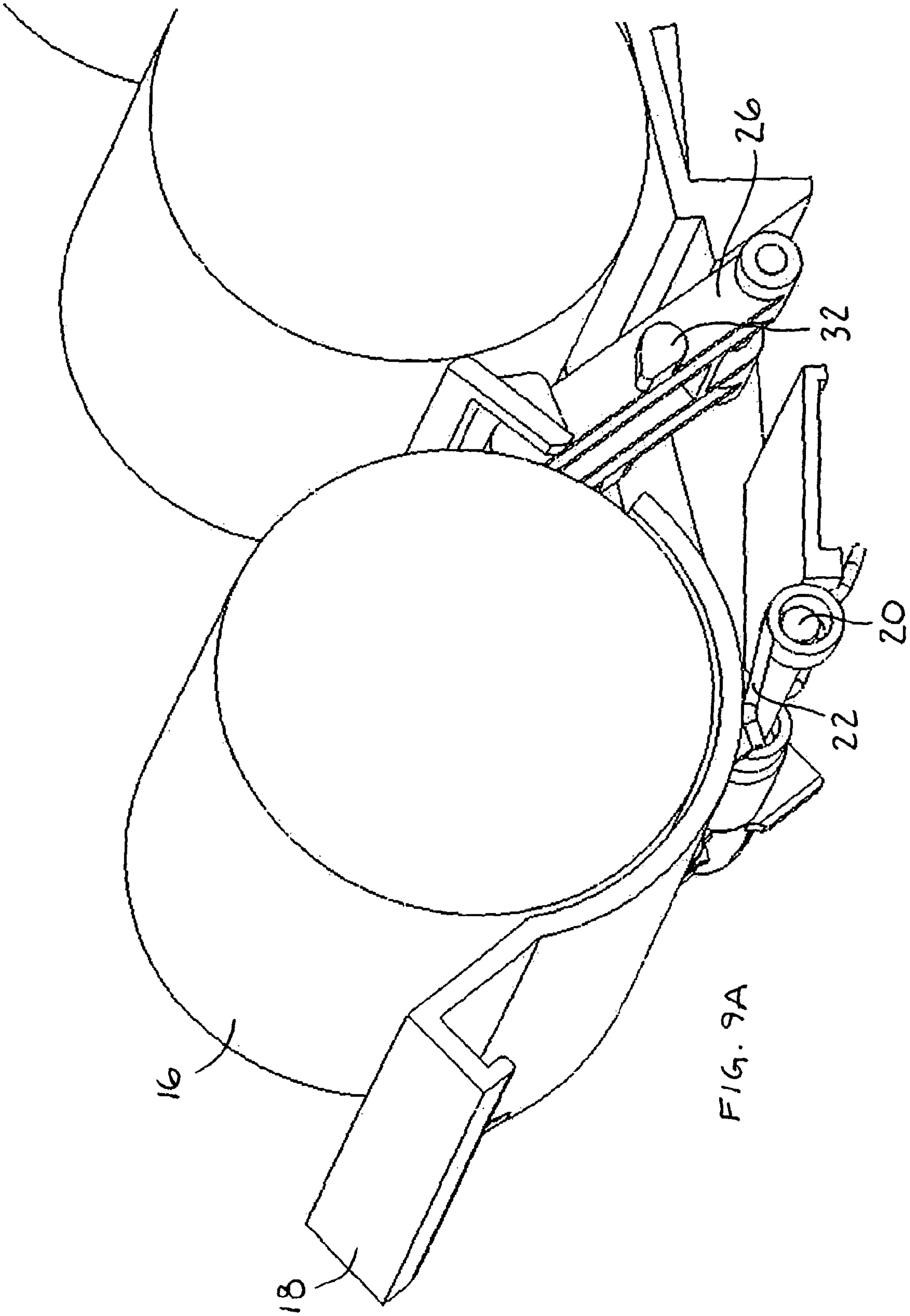

Reference is now made to FIGS. 9 and 9A. If a person attempts to push the merchandise 16 back into the vending machine 10 by pushing door 18 back clockwise around pivot axle 20, an upper edge of door 18 abuts against an upper portion of one-way stopper 26 so as to arrest movement of door 18. This prevents returning the merchandise 16 back into the vending machine 10.

Figure 10:
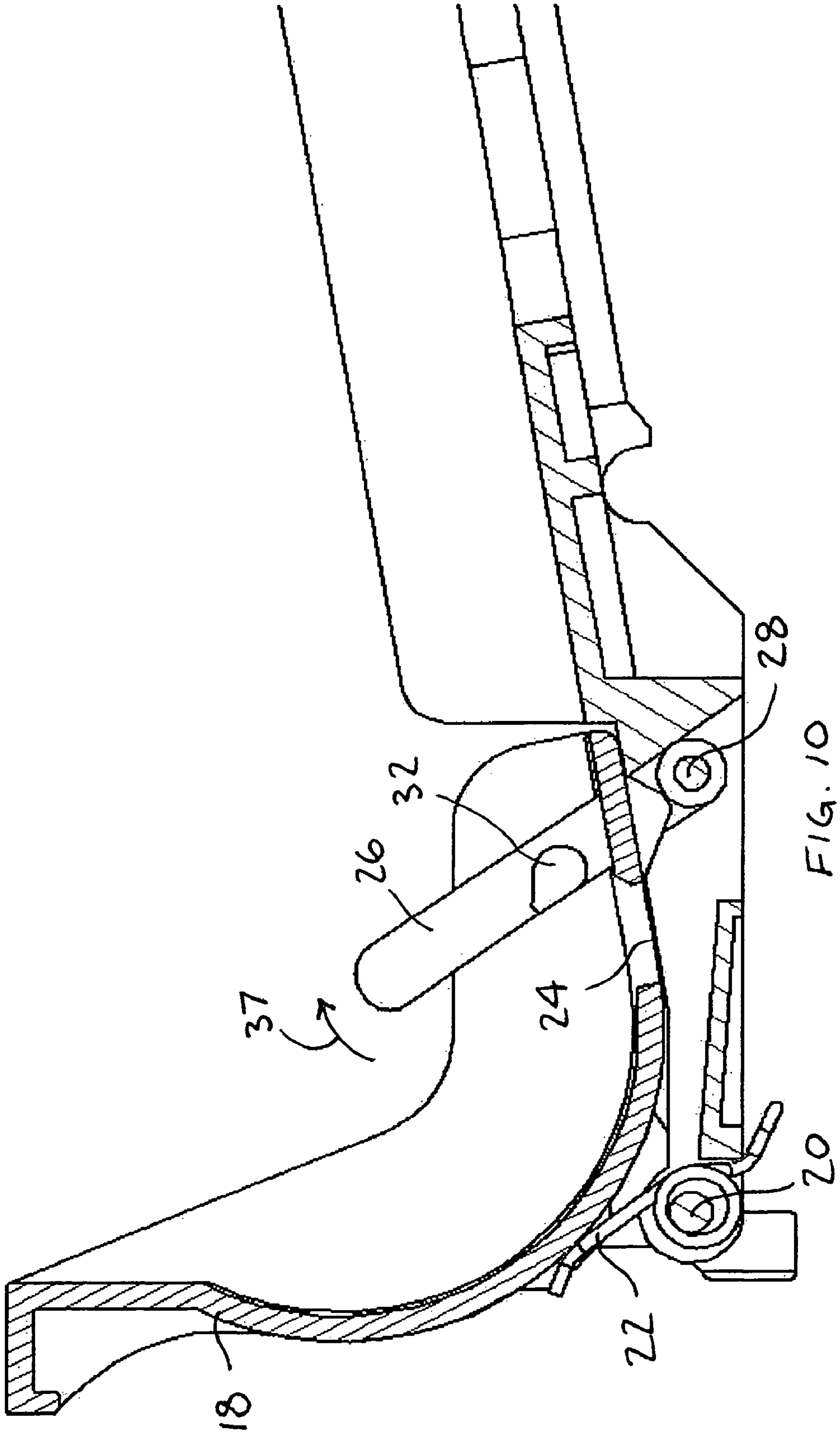
FIGS. 10 and 10A are simplified partially sectional and pictorial illustrations, respectively, of the vending machine with no merchandise therein and the one-way stopper deployed.
Figure 10A:
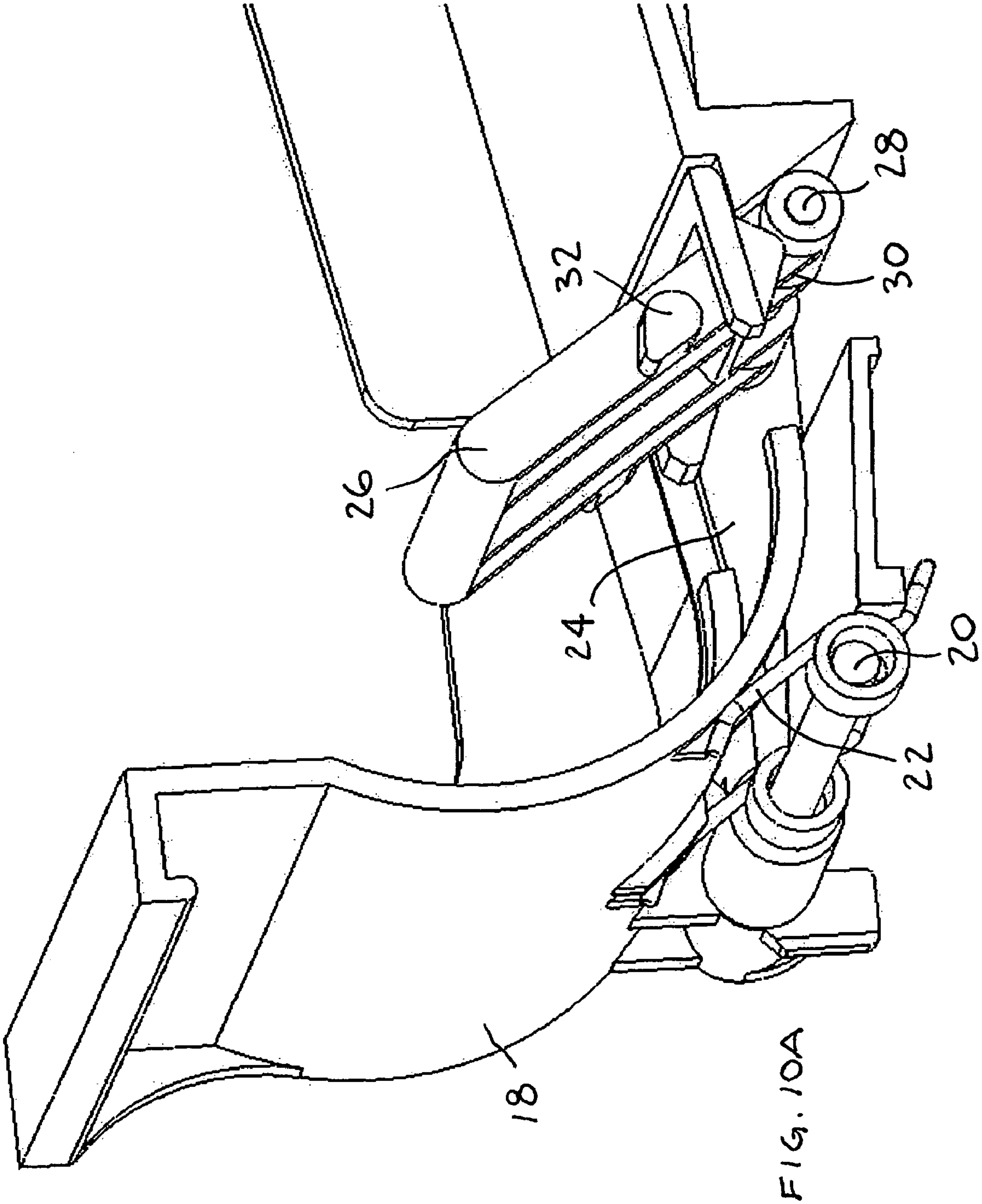

Reference is now made to FIGS. 10 and 10A, which illustrate the vending machine 10 with no merchandise 16 therein. Since no weight is forced on one-way stopper 26, biasing device 30 urges one-way stopper 26 to swing clockwise (in the sense of the drawing figures) about pivot axle 28, as indicated by arrow 37. The one-way stopper 26 and its lugs 32 pass unobstructed through window 24.

Figure 11:
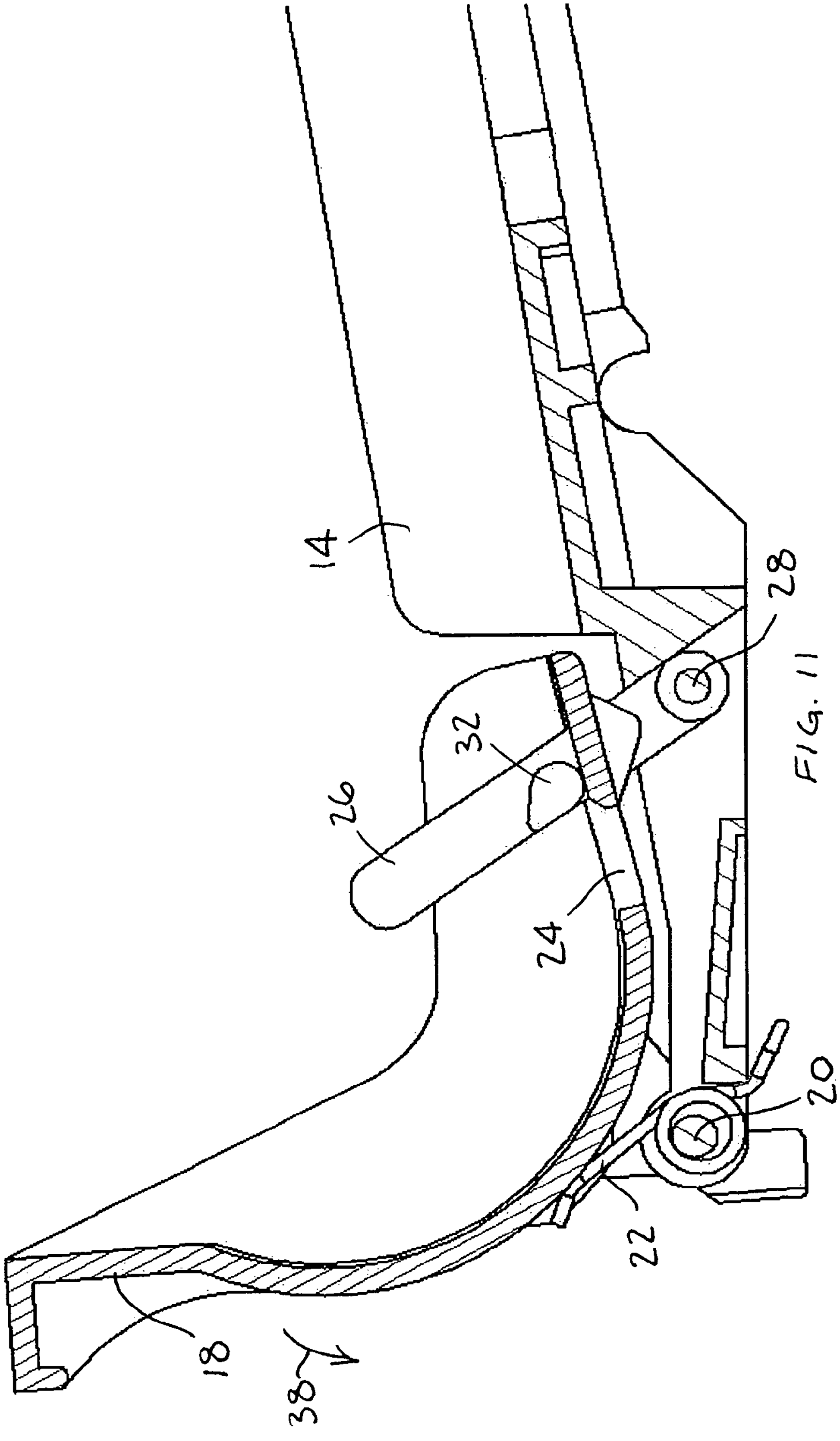
FIGS. 11 and 11A are simplified partially sectional and pictorial illustrations, respectively, of the vending machine with no merchandise therein and the dispensing door blocked from being opened by the one-way stopper.
Figure 11A:
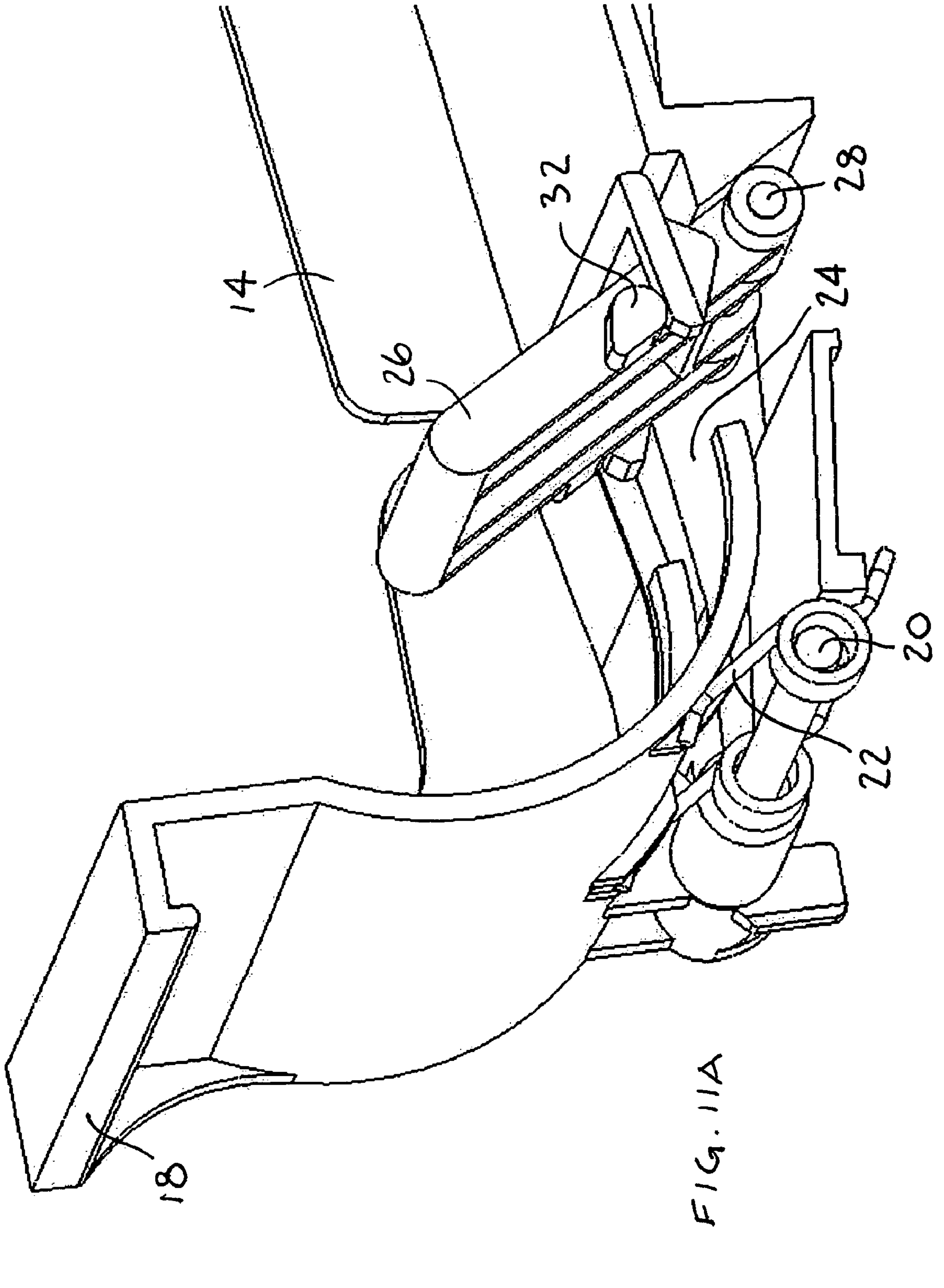

Reference is now made to FIGS. 11 and 11A. If someone were to try opening the door 18 by swinging the door 18 counterclockwise about pivot axle 20, as indicated by arrow 38, a portion of door 18 abuts against lugs 32 so as to arrest movement of door 18. Accordingly, the dispensing door 26 is blocked from being opened by the one-way stopper 26.

It is noted that in the prior art, vending machines are provided with a storage chamber or volume for storing and refrigerating the beverage cans and the like. This storage chamber is connected by a chute and the like to another volume for dispensing the beverage can and the like. Thus, in the prior art, two separate chambers are required—one for storing and the other for dispensing. In contrast, in the present invention, only one chamber is required that serves as both the storage chamber and the dispensing chamber. In other words, the tray 14 with dispensing door 18 and the one-way stopper 26 is a dual-purpose unit for storing and dispensing. Thus, the present invention provides significant volumetric savings as well.

The scope of the present invention includes both combinations and subcombinations of the features described hereinabove as well as modifications and variations thereof which would occur to a person of skill in the art upon reading the foregoing description and which are not in the prior art.

What is claimed is:

1. Apparatus comprising:

a vending machine comprising a dispensing door openable to permit removal of merchandise from said vending machine; and a one-way stopper positioned relative to said dispensing door, such that upon removal of merchandise from the vending machine, said one-way stopper is deployed to a position that prevents placing the merchandise back in the vending machine, wherein when said one-way stopper is deployed to the position that prevents placing the merchandise back in the vending machine, said one-way stopper blocks said dispensing door from moving therepast, wherein said dispensing door is formed with a window in which is disposed said one-way stopper.

2. The apparatus according to claim 1, further comprising a tray loadable with the merchandise for dispensing thereof, said dispensing door being openable to permit removal of merchandise from said tray.

3. The apparatus according to claim 1, wherein said dispensing door is biasedly pivoted about a pivot axle by means of a biasing device.

4. The apparatus according to claim 2, wherein said tray, said dispensing door and said one-way stopper comprise a dual-purpose unit for storing and dispensing merchandise without separating a vending machine storage chamber from a vending machine dispensing chamber.

5. The apparatus according to claim 2, further comprising at least one sensor adapted to sense a presence of merchandise on said tray.

6. Apparatus comprising:

a vending machine comprising a dispensing door openable to permit removal of merchandise from said vending machine; and a one-way stopper positioned relative to said dispensing door, such that upon removal of merchandise from the vending machine, said one-way stopper is deployed to a position that prevents placing the merchandise back in the vending machine, wherein when said one-way stopper is deployed to the position that prevents placing the merchandise back in the vending machine said one-way stopper blocks said dispensing door from moving therepast, wherein said one-way stopper is biasedly pivoted about a pivot axle by means of a biasing device, said biasing device being adapted to urge said one-way stopper to the position that prevents placing the merchandise back in the vending machine.

7. Apparatus comprising:

a vending machine comprising a dispensing door openable to permit removal of merchandise from said vending machine; and a one-way stopper positioned relative to said dispensing door, such that upon removal of merchandise from the vending machine, said one-way stopper is deployed to a position that prevents placing the merchandise back in the vending machine, wherein said one-way stopper comprises a pair of lugs that jut sideways from lateral sides thereof, wherein said one-way stopper is positionable such that a portion of said dispensing door abuts against said lugs so as to arrest movement of said dispensing door.

8. The apparatus according to claim 7, wherein said one-way stopper is positionable such that a portion of said dispensing door abuts against a portion of said one-way stopper so as to arrest movement of said dispensing door.

* * * * *